United States Patent

Siegel

[11] Patent Number: 5,168,708
[45] Date of Patent: Dec. 8, 1992

[54] DISPOSABLE AND REUSABLE VALVELESS SORPTION SELF-COOLING AND SELF-HEATING CONTAINERS

[76] Inventor: Israel Siegel, 2980 Point East Dr. Apt. D-612, N. Miami Beach, Fla. 33160

[21] Appl. No.: 763,645
[22] Filed: Sep. 23, 1991
[51] Int. Cl.[5] .............................................. F25D 5/00
[52] U.S. Cl. ........................................ 62/4; 126/263; 62/101; 165/104.12
[58] Field of Search ..................... 62/4, 101; 126/263; 165/104.12

[56] References Cited

U.S. PATENT DOCUMENTS

| | | |
|---|---|---|
| 4,250,720 | 2/1981 | Siegel ................... 62/480 |
| 4,462,224 | 7/1984 | Dunshee et al. ........... 62/4 |
| 4,736,599 | 4/1988 | Siegel ................... 62/294 |
| 4,752,310 | 6/1988 | Maier-Laxhuber et al. ..... 62/4 |
| 4,759,191 | 7/1988 | Thomas et al. ........... 62/337 |
| 4,901,535 | 2/1990 | Sabin et al. ............ 62/480 |
| 4,928,495 | 5/1990 | Siegel .................. 62/294 |

Primary Examiner—Ronald C. Capossela

[57] ABSTRACT

The invention consists of improvements in disposable and reuseable sorption temperature changers which eliminate the necessity of using valves which perforate the walls of the device. This facilitates the preservation of a long term leak proof air vacuum in the device, and reduces the cost of the device. Water in an air evacuated chamber boils at low temperature and cools its surroundings. The vapor generated by the low boiling point liquid is removed by sorption by a desiccant placed in a separate chamber. The sorbed vapor heats the desiccant and it surroundings. The temperature changing potential of the device can be preserved indefinitely by a barrier which prevents a communication between the liquid and desiccant chambers. The temperature changer is activated by a pliable or flexible surface portion which punctures or dislocates the barrier between the chambers.

15 Claims, 5 Drawing Sheets

DISPOSABLE AND REUSABLE VALVELESS SORPTION SELF-COOLING AND SELF-HEATING CONTAINERS

BACKGROUND AND OBJECTIVES

The invention relates to self cooling and self heating containers, and in particular to disposable and renewable self-heating and self heating sorption containers which operate without valves which perforate the surfaces of the device. Previous inventions relating to sorption self cooling and self heating containers have been described by the present author in U.S. Pat. Nos. 4,250,720, 4,736,599, and 4,928,495, by Thomas et al in U.S. Pat. No. 4,759,191, and by Sabin et al in U.S. Pat. No. 4,901,535. Essentially, the self cooling and self heating containers consists of a chamber containing water, the boiling point of which has been lowered by an air vacuum in the chamber. The chamber communicates through a pipe with another chamber containing a desiccant. As the water boils it cools itself and absorbs heat from a food or a beverage which is preferred to be consumed at low temperatures. The vapor generated by the low boiling point water is removed by the desiccant. The vapor sorbed by the desiccant heats the desiccant. The desiccant then delivers heat to a food or a beverage which is preferred to be consumed at high temperatures. By closing the communication between the water and desiccant chambers the self cooling and self heating device can be stored indefinitely without losing its temperature changing potential. The cooling or heating action is initiated by opening of the communication between the water and the desiccant chambers. Thus, a reversible closing of the communication between the water and the desiccant chamber is essential for the storage and operation of the device. This has been previously achieved by valve means which open and close the pipe between the chambers.

The air vacuum which is required to lower the boiling point of the water, must often be maintained through out months or even years of the shelf life of the food or beverage. To prevent an air leak into the system through the valve an air tight and leak proof valve is essential. Standard valves which are manipulated through means which have perforated the wall of the temperature changer present a continuous leak hazard and are not suited for such strict vacuum requirement. Commercially available vacuum valves are too expensive for use in disposable or relatively cheap beverage containers. The main objective of the present invention is to provide inexpensive sorption self cooling and self heating containers which can operate without valves which perforate the surfaces of the device, and which remain vacuum proof during prolonged storage and operation of the device.

SUMMARY

The self cooling and self heating device consists of a chamber containing water, the boiling point of which has been lowered by an air vacuum in the chamber. The chamber communicates through a pipe with another chamber containing a desiccant. As the water boils it cools itself and absorbs heat from a food or a beverage which is preferred to be consumed at low temperatures. The vapor generated by the low boiling point water is removed by the desiccant. The vapor sorbed by the desiccant heats the desiccant. The desiccant then delivers heat to a food or a beverage which is preferred to be consumed at high temperatures. By closing the communication between the water and desiccant chambers the self cooling and self heating device can be stored indefinitely without losing its temperature changing potential. This is accomplished by a wall which forms a barrier between the liquid and the desiccant chambers. When the barrier is removed a communication between the vapor phase of the water chamber and the desiccant chamber is allowed to occur. This activates the device and the temperature changing processes are initiated. In the disposable embodiments of the device a pliable or flexible surface portion controls the movement of a pin which punctures the barrier between the chambers. Alternatively, the moveable surface dislocates the barrier by a pulling action. In the renewable device the moveable surface portion controls the movement of a stopper which opens and closes the communication between the chambers.

DETAILED DESCRIPTION

Figure 1:
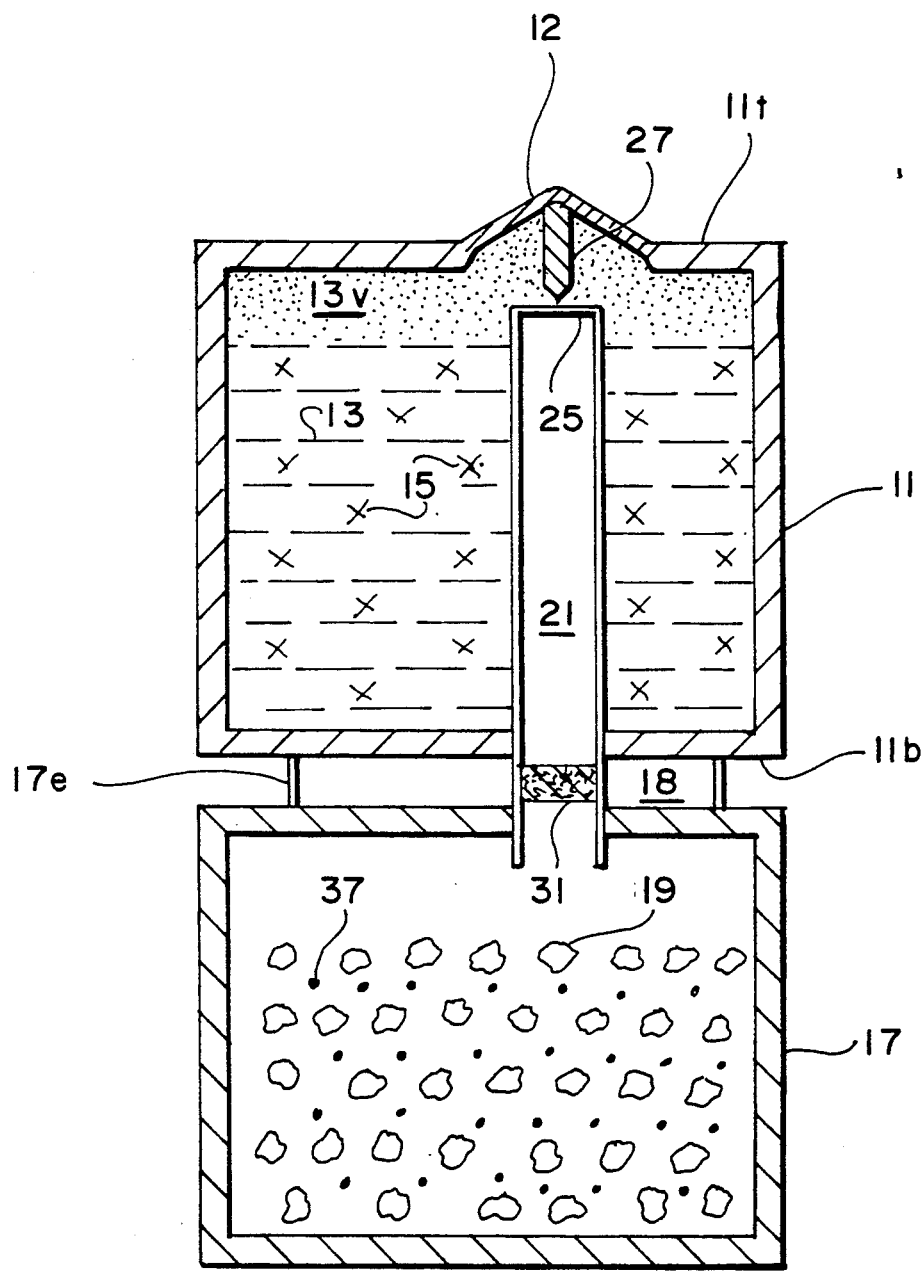
FIG. 1 is a cross-sectional view of an embodiment of a disposable temperature changer in which the communication between the liquid and the desiccant chamnber is opened by a pliable surface material of the liquid chamber.

Referring to FIG. 1, there is shown a chamber 11, with top wall 11-*t*, and bottom wall 11-*b*. An air vacuum of at least 5 microns is present in the chamber. The arrangement is that the air vacuum required for this and all other embodiments of the invention is accomplished through a temporary outlet (not shown) connected to an air pump (not shown). The outlet is sealed after the air has been withdrawn. The walls of the chamber and all other structural components of the present and subsequent embodiments are constructed of non-porous materials, such as tin, aluminum, or plastic. The material must be strong enough so that it does not deform during the presence of an air vacuum in the chamber. A portion 12 of top wall 11-*t* is composed of pliable material which can be deformed manually in a downward direction. For example, surface 11-*t* may be made out of relatively stiff aluminum, while portion 12 may be composed of pliable aluminum foil. The two materials are soldered to each other so that portion 12 is an integral part of surface 11-*t*. The portion 12 is shaped to be slightly raised above the general level of surface 11-*t* so that, when required, it can be manually pressed down to the general level of surface 11-t.

A beverage 13 is present in chamber 11. A refrigerant consisting of water 15 is then added into the chamber. The water 15 becomes incorporated into the natural water of the beverage to form a diluted beverage. The amount of water 15 introduced into chamber 11 is equal to about 10% of the amount of beverage present in chamber 11. For example, 25 ml of water is added to 250 ml of beverage. This is approximately equal to the amount of water which would be lost by evaporation from 250 ml of the the beverage during the cooling process, as will be described. The extra water which dilutes the beverage is thus removed during the operation of the device. The beverage and the water may be transferred into the chamber, in this and other embodiments of the invention, through a temporary inlet (not shown) which is sealed after the liquid transfer. The water of the beverage evaporates to form a vapor phase 13v above the liquid level of the beverage-water mixture.

Present below chamber 11 is another chamber 17. An air vacuum similar to the air vacuum in the liquid chamber is present inside the chamber. A small air space 18 is present between the chambers. The air space serves as an insulating layer between the chambers. Wall extensions 17-e from the top outside surface of chamber 17 are attached to the bottom outside surface of chamber 11 and serve to fix the the relative positions of chamber 11 and chamber 17. Inside chamber 17 there is a desiccant 19, such as a non-toxic molecular sieve like Silico Aluminate Zeolite. The amount of desiccant is approximately equal to the amount of the beverage in the beverage chamber 11. For example, 250 grams of desiccant is used to cool a 250 ml beverage. The desiccant can sorb water vapor which is about 10% of the desiccant's weight. In the above example this is equal to about 25 grams of water vapor. The desiccant chamber also contains a water absorber 37, such as an SGP absorbent polymer (General Mill Chemicals). The absorbent can absorb water which is about 500 times the absorber's weight. The absorbent immobilizes liquids which have accidentally entered the desiccant chamber, and prevents the liquid from returning to the beverage chamber. About 5-10 grams of the absorber are required to absorb 250 ml beverage.

Present inside chamber 11 is a pipe 21. The pipe 21 contains a bottom open end and a closed top end. The top end is closed by wall 25. The arrangement is that pipe 21 is placed vertically in container 11. Wall 25 is placed parallel and at close distance to the top surface of container 11. The bottom portion of pipe 21 goes through the bottom wall of container 11 and the top wall of container 17. The bottom open end of pipe 21 thus communicates with the top inside space of container 17. There is no communication between pipe 21 and the inside of water chamber 11 during storage of the device. Solder is applied to the junctures of the pipe 21 and the container surfaces which have been penetrated by the pipe to prevent any leakage from the junctures.

Attached to the top inside surface of wall 12 is a pin 27. The arrangement is that the pin is placed vertically inside chamber 11, with the sharp end of the pin facing wall 25 of pipe 21. The blunt end of the pin is fixed to the inside portion of top wall 12. The arrangement is, that as wall 12 is pushed downward pin 27 moves towards wall 25. The length of the pin is such that when wall 12 is at its high position the sharp end of the needle touches wall 25. The strength of wall 25 is such that it forms a barrier to a downward movement of pin 27 and wall 12 when wall 12 is not pressed manually. The barrier prevents the collapse of wall 12 in a downward direction when an air vacuum is induced in chamber 11. When wall 12 is manually pressed downward, pin 27 is forced to move towards wall 25 to pierce wall 25.

Present inside pipe 21 is a filter 31. The filter is designed to block the transfer of desiccant from the desiccant chamber to the beverage chamber, but to allow a free movement of vapor between the chambers. The filter is glued to the inside walls of the pipe to prevent the filter from falling out of the pipe.

The operation of the device is as follows. When a cooling action is not desired, wall 12 is in its high position. Wall 25 prevents wall 12 and pin 27 from moving downward. Intact wall 25 prevents a communication between chambers 11 and 17. The vacuum in chamber 11 causes the beverage-water mixture to boil until the vapor pressure in chamber 11 becomes equal to the vapor pressure of the boiling water. This stops the additional boiling of the water, and the device can be stored indefinitely at ambient temperatures without losing its cooling and heating potentials.

When a temperature change is desired wall 12 is pressed downward. Pin 27 moves with wall 12 and pierces wall 25. This establishes a communication between chambers 11 and 17 through pipe 21. This allows vapor 13v to leave chamber 11 and enter chamber 17. The vapor which enters chamber 17 is absorbed or adsorbed by desiccant 19. This reduces the vapor pressure in the chamber 17 to below that of chamber 11. This causes an additional transfer of vapor from chamber 11 to chamber 17. The vapor in chamber 11 is then replaced by additional boiling of water in chamber 11. The water present in beverage 13 boils continuously until desiccant 19 is saturated with water vapor, or until the temperature of beverage 13 drops to the boiling point of its water. When the temperature of the beverage drops it is ready for consumption. The vapor which is sorbed by desiccant 19 heats the desiccant. If desired, the hot desiccant can be used to heat a food or a beverage (not shown). Filter 31 prevents an accidental contamination of the beverage by the desiccant during the piercing of the barriers between the chambers. Water absorber 18 prevents the return to the beverage chamber of any liquids which have accidentally entered the desiccant chamber.

Figure 2:
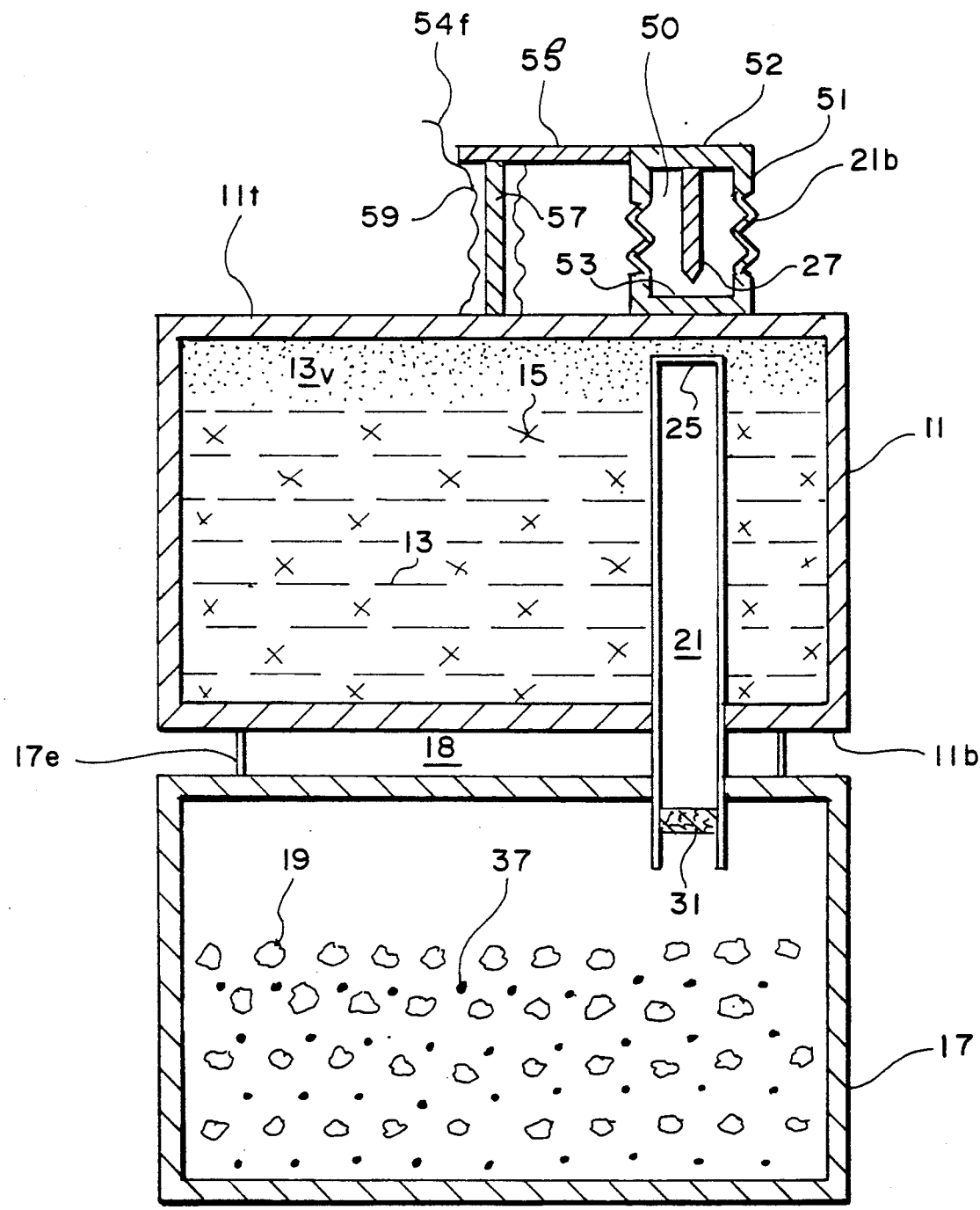
FIG. 2 is a cross-sectional view of an embodiment of a disposable temperature changer in which the communication between the liquid and the desiccant chamnber is opened by a bellows chamber present outside of the liquid chamber.

Referring to FIG. 2, there is shown an embodiment which is similar to that of FIG. 1, except that a bellows chamber, outside of the liquid chamber, is used, instead of a pliable surface portion of the liquid chamber. Similar components have been given similar numbers. The embodiment includes a chamber 11, with top wall 11-t and bottom wall 11-b. An air vacuum of at least 5 microns is present in the chamber. A beverage 13 is present in the chamber. A refrigerant consisting of water 15 is then added into the chamber. The water 15 becomes incorporated into the natural water of the beverage to form a diluted beverage. The water of the beverage evaporates to form a vapor phase 13v above the liquid level of the beverage-water mixture.

Present below chamber 11 is another chamber 17. An air vacuum similar to the air vacuum in the liquid chamber is present inside the chamber. A small air space 18 is present between the chambers. The air space serves as an insulating layer between the chambers. Wall extensions 17-e from the top outside surface of chamber 17 are attached to the bottom outside surface of chamber 11 and serve to fix the the relative positions of chamber 11 and chamber 17. Inside the chamber 17 there is a desiccant 19, such as a non-toxic molecular sieve like Silico Aluminate Zeolite. The desiccant chamber also contains a water absorber 37, such as an SGP absorbent polymer (General Mill Chemicals). The absorbent immobilizes liquids which have accidentally entered the desiccant chamber, and prevents the liquid from returning to the beverage chamber, as will be described.

Present inside chamber 11 is a pipe 21. The pipe 21 contains a bottom open end and a closed top end. The top end is closed by wall 25. The arrangement is that pipe 21 is placed vertically in container 11. Wall 25 is placed parallel and at close distance to the top surface of container 11. The bottom portion of pipe 21 goes through the bottom wall of container 11 and the top wall of container 17. The bottom open end of pipe 21 thus communicates with the top inside space of container 17. There is no communication between pipe 21 and the inside of water chamber 11 during storage of the device. Solder is applied to the junctures of the pipe 21 and the container surfaces which have been penetrated by the pipe to hold the pipe in place and to prevent any leakage from the junctures.

Present on top of water chamber 11 is bellows chamber 50. An air vacuum similar to the air vacuum in the liquid chamber is present inside the bellows chamber. The bellows chamber has side walls 51, top wall 52, and bottom wall 53. The arrangement is that side walls 51 are vertical to surface 11-t, and top and bottom walls 52 and 53 are parallel to surface 11-t. The bellows chamber is present on a portion of surface 11-t which is opposite wall 25 of pipe 21. Wall 53 is closely applied to the surface 11-t of chamber 11 and pressed to the surface to expel all air bubbles between the walls. Wall 53 is then fixed in its position by soldering or welding the surfaces 53 and 11-t together. There is no communication between chamber 50 and the inside of water chamber 11 during storage of the device. A portion of side walls 51 is composed of bellows 21-b. The bellows allows a variation in the length of the side walls and in the distance between top wall 52 of the bellows chamber and the top surface 11-t of chamber 11. Attached to the top inside surface of wall 52 is a pin 27. The arrangement is that the pin is placed vertically inside chamber 50, with the sharp end of the pin facing the water chamber 11. The blunt end of the pin is fixed to the inside portion of top wall 52. The arrangement is, that as the bellows 21-b moves from an extended to a folded position, pin 27 moves towards water chamber 11. The length of the pin is such that when the bellows is at its extended position the sharp end of the needle is at a very close proximity to wall 53. When the bellows moves to a folded position the pin moves towards wall 53 and pierces walls 53, 11-t and 25.

Present inside pipe 21 is a filter 31. The filter is designed to block the transfer of desiccant from the desiccant chamber to the beverage chamber, but to allow a free movement of vapor between the chambers. The filter is glued to the inside walls of the pipe to prevent the filter from falling out of the pipe.

Extending from top wall 52 of bellows container 50 is a horizontal wall extension 55. A vertical rod 57 is present between wall extension 55 and the top surface 11-t of container 11. The rod serves to prevent an accidental movement of bellows 51-b from an extended to a folded position, and to prevent an accidental piercing of the surface of the water chamber by pin 27 during the storage of the device. The length of rod 57 is such that it keeps surfaces 11-t and 55 a distance which keeps bellows 21-b at an extended position. The rod 57 is fixed in a vertical position by sticky paper or sticky carbord 59 which is may be part of the wrapping material. A flap 59-f extends from paper 59. The arrangement is that the packaging material 59 can be grasped through flap 59-f and can be easily torn and removed.

The operation of the device is as follows. When a cooling action is not desired, bellows 21-b is in an extended position. Chamber 11 rests on rods 73. Intact wall 25 prevents a communication between chambers 11 and 17. The vacuum in chamber 11 causes the beverage-water mixture to boil until the vapor pressure in chamber 11 becomes equal to the vapor pressure of the boiling water. This stops the additional boiling of the water, and the device can be stored indefinitely at ambient temperatures without losing its cooling and heating potentials.

When a temperature change is desired flaps 59-f is grasped and wrapping paper 59 is removed. Rod 57 is then removed from its vertical position so that it no longer prevents a movement of bellows 21-b from its extended to its folded position. Top wall 52 is then pushed downward. This causes the bellows 21-b to move from an extended position to a folded position. Pin 27 moves closer to chamber 11 and pushes against wall 53. The pin then pierces wall 53 and pushes against surface 11-t of chamber 11. The pin then pierces surface 11-t and continues to push against wall 25. Wall 25 is then pierced by the pin. This establishes a communication between chambers 11 and 17 through pipe 21. This allows vapor 13v to leave chamber 11 and enter chamber 17. The vapor which enters chamber 17 is absorbed or adsorbed by desiccant 19. This reduces the vapor pressure in the chamber 17 to below that of chamber 11. This causes an additional transfer of vapor from chamber 11 to chamber 17. The vapor in chamber 11 is then replaced by additional boiling of water in chamber 11. The water present in beverage 13 boils continuously until desiccant 19 is saturated with water vapor, or until the temperature of beverage 13 drops to the boiling point of its water. When the temperature of the beverage drops it is ready for consumption. The vapor which is sorbed by desiccant 19 heats the desiccant. If desired, the hot desiccant can be used to heat a food or a beverage (not shown). Filter 31 prevents an accidental contamination of the beverage by the desiccant during the piercing of the barriers between the chambers. Water absorber 37 prevents the return to the beverage chamber of any liquids which have accidentally entered the desiccant chamber.

Figure 3:
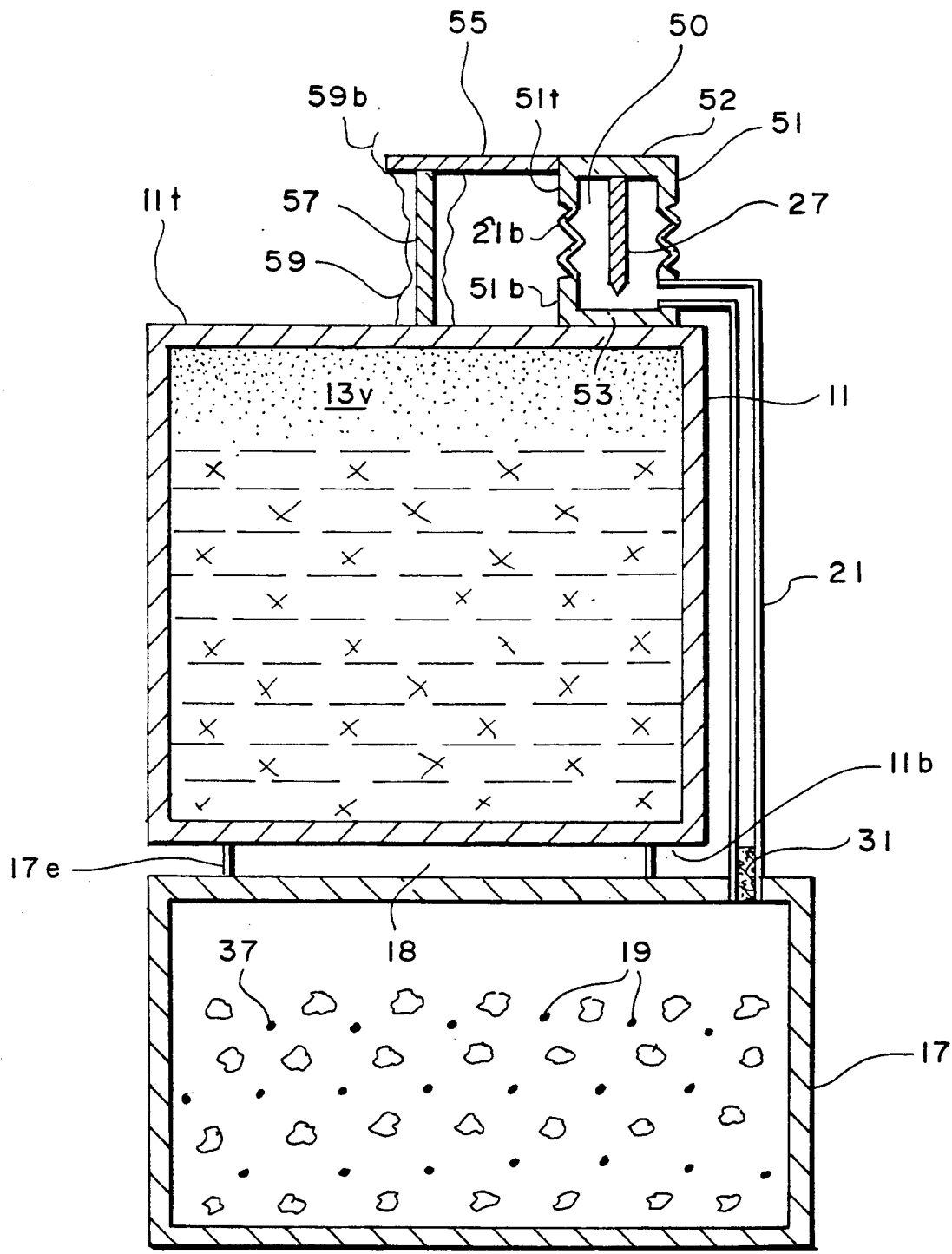
FIG. 3 is a cross-sectional view of an embodiment of a disposable temperature changer in which the communication between the liquid and the desiccant chamnber passes through the bellows chamber.

FIG. 3 represent an embodiment of the invention which is similar to that described in FIG. 2 except that the communication between the chambers passes through the bellows chamber. Referring to FIG. 3 there is shown a chamber 11, with top wall 11-t and bottom wall 11-b. An air vacuum of at least 5 microns is present in the chamber. A beverage 13 is present in the chamber. A refrigerant consisting of water 15 is then added into the chamber. The water 15 becomes incorporated into the natural water of the beverage to form a diluted beverage. The water of the beverage evaporates to form a vapor phase 13v above the liquid level of the beverage-water mixture.

Present below chamber 11 is another chamber 17. An air vacuum similar to the air vacuum in the liquid chamber is present inside the chamber. A small air space 18 is present between the chambers. The air space serves as an insulating layer between the chambers. Wall extensions 17-e from the top outside surface of chamber 17 are attached to the bottom outside surface of chamber 11 and serve to fix the the relative positions of chamber 11 and chamber 17. Inside the chamber 17 there is a desiccant 19, such as a non-toxic molecular sieve like Silico Aluminate Zeolite. The desiccant chamber also contains a water absorber 37, such as an SGP absorbent polymer (General Mill Chemicals). The absorbent immobilizes liquids which have accidentally entered the desiccant chamber, and prevents the liquid from returning to the beverage chamber.

Present on top of water chamber 11 is bellows chamber 50. The bellows chamber is part of a conduit between the chambers as will be described. The bellows chamber has side walls 51, top wall 52, and bottom wall 53. The arrangement is that side walls 51 are vertical to surface 11-t, and top and bottom walls 52 and 53 are parallel to surface 11-t. Wall 53 is closely applied to the surface 11-t of chamber 11 and pressed to the surface to expel all air bubbles between the walls. Wall 53 is then fixed in its position by soldering the surfaces 53 and 11-t together. There is no communication between chamber 50 and the inside of water chamber 11 during storage of the device. A top portion of side walls 51 is composed of bellows 21-b. The bellows allows a variation in the length of the side walls and in the distance between top wall 52 of the bellows chamber and the top surface 11-t of chamber 11. The bellows divides side walls 51 into a wall portion 51-t which is adjacent to top wall 52, and a wall portion 51-b which is adjacent bottom wall 53. The arrangement is that the movements of wall 52-t and bellows 21-b do not effect the position of wall portion 51-b.

Present inside container 50 is a pin 27. The arrangement is that the pin is placed vertically inside chamber 50, with the sharp end of the pin facing the water chamber 11. The blunt end of the pin is fixed to the inside portion of top wall 52. The arrangement is, that as the bellows 21-b moves from an extended to a folded position, pin 27 moves towards water chamber 11. The length of the pin is such that when the bellows is at its extended position the sharp end of the needle is at a very close proximity to wall 53. When the bellows moves to a folded position the pin moves towards wall 53 and pierces walls 53 and 11-t.

A pipe 21 communicates between the top portion of the desiccant chamber 17 and the bottom portion of bellows chamber 50 through side wall portion 51-b of the bellows chamber. Present inside pipe 21 is a filter 31. The filter is designed to block the transfer of desiccant from the desiccant chamber to the beverage chamber, but to allow a free movement of vapor between the chambers. The filter is glued to the inside walls of the pipe to prevent the filter from falling out of the pipe.

Extending from top wall 52 of bellows container 50 is a horizontal wall extension 55. A vertical rod 57 is present between wall extension 55 and the top surface 11-t of container 11. The rod serves to prevent an accidental movement of bellows 21-b from an extended to a folded position, and to prevent an accidental piercing of the surface of the water chamber by pin 27 during the storage of the device. The length of rod 57 is such that it keeps surfaces 11-t and 55 a distance which keeps bellows 21-b at an extended position. The rod 57 is fixed in a vertical position by sticky paper or sticky carbord 59 which is part of the wrapping material. A flap 59-f extends from paper 59. The arrangement is that the packaging material 59 can be grasped through flap 59-f and can be easily torn and removed.

The operation of the device is as follows. When a cooling action is not desired, bellows 21-b is in an extended position. Intact walls 53 and 11-t prevent a communication between chambers 11 and 17. The vacuum in chamber 11 causes the beverage-water mixture to boil until the vapor pressure in chamber 11 becomes equal to the vapor pressure of the boiling water. This stops the additional boiling of the water, and the device can be stored indefinitely at ambient temperatures without losing its cooling and heating potentials.

When a temperature change is desired flaps 59-f is grasped and wrapping paper 59 is removed. Rod 57 is then removed from its vertical position so that it no longer prevents a movement of bellows 21-b from its extended to its folded position. Top wall 52 is then pushed downward. This causes the bellows 21-b to move from an extended position to a folded position. Pin 27 moves closer to chamber 11 and pushes against wall 53. The pin then pierces wall 53 and pushes against surface 11-t of chamber 11. The pin then pierces surface 11-t. This establishes a communication between chambers 11 and 17 through the conduit consisting of bellows chamber 50 and pipe 21. This allows vapor 13v to leave chamber 11 and enter chamber 17. The vapor which enters chamber 17 is absorbed or adsorbed by desiccant 19. This reduces the vapor pressure in the chamber 17 to below that of chamber 11. This causes an additional transfer of vapor from chamber 11 to chamber 17. The vapor in chamber 11 is then replaced by additional boiling of water in chamber 11. The water present in beverage 13 boils continuously until desiccant 19 is saturated with water vapor, or until the temperature of beverage 13 drops to the boiling point of its water. When the temperature of the beverage drops it is ready for consumption. The vapor which is sorbed by desiccant 19 heats the desiccant. If desired, the hot desiccant can be used to heat a food or a beverage (not shown). Filter 31 prevents a contamination of the beverage by the desiccant during the piercing of the barriers between the chambers. Water absorber 18 prevents the return to the beverage chamber of any liquids which have accidentally entered the desiccant chamber.

Figure 4:
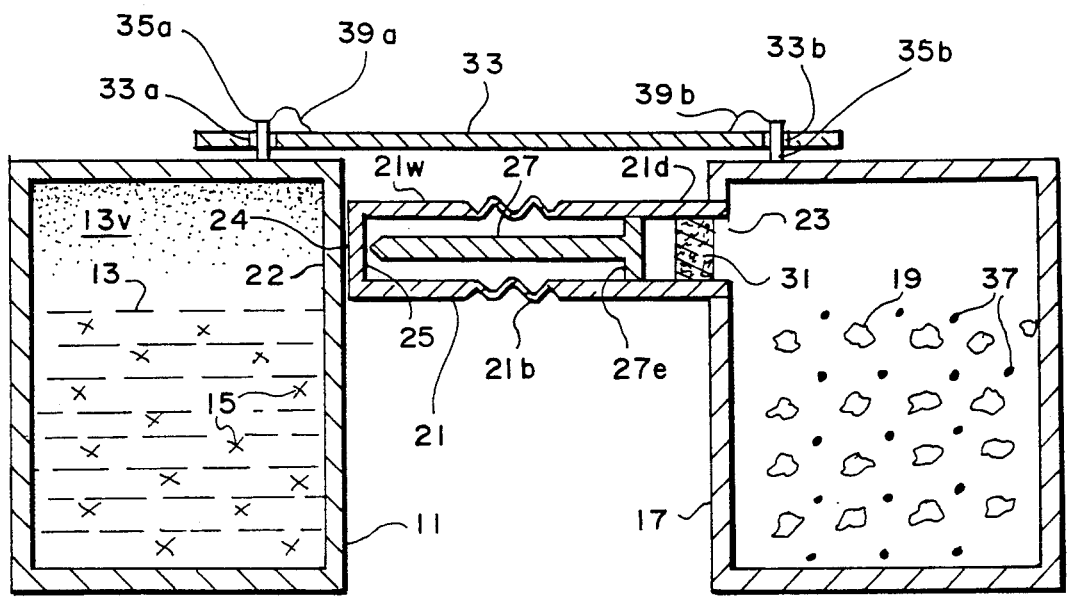
FIG. 4 is a cross-sectional view of an embodiment of a valveless disposable temperature changer in which the bellows chamber is part of a pipe communicating between the liquid and the desiccant chambers.

Referring to FIG. 4, there is shown a chamber 11. A beverage 13 is present in the chamber. A refrigerant consisting of water 15 is then added into the chamber. The water 15 becomes incorporated into the natural water of the beverage to form a diluted beverage. The water of the beverage evaporates to form a vapor phase 13v above the liquid level of the beverage-water mixture.

Present beside chamber 11 is another chamber 17. Inside the chamber 17 there is a desiccant 19, such as a non-toxic molecular sieve like Silico Aluminate Zeolite. The desiccant chamber also contains a water absorber 37, such as an SGP absorbent polymer (General Mill Chemicals).

A conduit consisting of a pipe 21 communicates with the top portion of the desiccant chamber 17 through opening 23 in the side wall of the desiccant chamber. The pipe 21 contains an open end and a closed end. The arrangement is that the open end communicates with the inside space of chamber 17 through gap 23 in the wall of the chamber. The closed end is closed by wall 25. The arrangement is that wall 25 has a shape which is complementary to a top surface portion 22 of container 11. The wall 25 is then closely applied to surface 22 of chamber 11. The two surfaces are then pressed to each other to expel all air bubbles between the walls. The outside surfaces of walls 25 and 22 may be lined with a thin layer of flexible material such as rubber 24 to assure a tight fit between the surfaces. Wall 25 and 22 are then permanently fixed in their position by soldering the the margins of surfaces 25 and 22 together. There is no communication between pipe 21 and the inside of water chamber 11 during storage of the device. A middle portion of the walls of pipe 21 is composed of bellows 21-b. The bellows allows a variation in the length of the pipe and in the distance between the chambers. The bellows thus divides pipe 21 into a pipe portion 21-d which is adjacent to desiccant chamber 17, and a pipe portion 21-w which is adjacent to water chamber 11. Present inside pipe 21 is a pin 27. The arrangement is that the pin is placed parallel to pipe 21 in the center of pipe 21, with the sharp end of the pin facing the water chamber 11. The blunt end of the pin is fixed through vertical extensions 27-e to the inside walls of pipe portion 21-d. The arrangement is that as the chambers are moved closer together the bellows 21-b moves from an extended to a folded position, and pin 27 moves towards water chamber 11. The length of the pin is such that when bellows 21-b is at in its extended position the sharp end of the needle touches wall 25. The strength of wall 25 is such that it forms a barrier to a movement of pin 27 and bellows 21-b towards chamber 11. The barrier thus keeps bellows 21-b in an extended position even when an air vacuum is induced in chamber 17. The arrangement is that when additional pressure is exerted manually, the chambers are moved towards each other, the pin moves towards wall 25 and pierces walls 25 and 22.

Present inside pipe 21 is a filter 31. The filter is designed to block the transfer of desiccant from the desiccant chamber to the beverage chamber, but to allow a free movement of vapor between the chambers. The filter is glued to the inside walls of the pipe to prevent the filter from falling out of the pipe.

Present on top of the water chamber 11 and the desiccant chamber 17 is bar 33. The bar serves to keep the chambers at a fixed distance from each other, and to prevent an accidental piercing of surfaces 25 and 22 during transportation and storage of the device. The length of bar 33 is such that it keeps the chambers at a distance which keeps bellows 21-b at an extended position. The bar 33 contains a hole 33-a in one end and a hole 33-b on its other end. Present on top of the water chamber 11 is knob 35a. Present on top of the desiccant chamber 17 is knob 35b. Extending from each knob respectively is a metal strip 39-a and 39-b. The arrangement is that the strips are made from a material that is pliable enough to be bent by hand. The location of the holes 33-a and 33-b in relationship to the strips and knobs is such that the holes fit over the strips and the knobs to enclose the knobs. When strips 39a and 39-b are in a vertical position bar 33 can be easily slipped in and out of the knobs. When the strips are bent to a horizontal or oblique position they prevent the bar from slipping out of the knobs.

The operation of the device is as follows. When a cooling action is not desired, bar 33 rests in knobs 35-a and 35-b and keeps chambers 11 and 17 at a predetermined distance from each other. Bellows 21-b is in an extended position. Strips 39-a and 39-b are in oblique or horizontal position to prevent bar 33 from slipping from the knobs. Wall 25 and the intact walls of the beverage container 11 prevent a communication between chambers 11 and 17. The vacuum in chamber 11 causes the beverage-water mixture to boil until the vapor pressure in chamber 11 becomes equal to the vapor pressure of the boiling water. This stops the additional boiling of the water, and the device can be stored indefinitely at ambient temperatures without losing its cooling and heating potentials.

When a temperature change is desired strips 39-a and 39-b are put in a vertical position and bar 33 is removed from knobs 35-a and 35-b. Chambers 11 and 17 are then pushed toward each other. This causes the position of bellows 21-b to change from an extended to a folded position. Pin 27 moves closer to chamber 11 and pushes against wall 25. The pin then pierces wall 25 and pushes against the surface of chamber 11. The pin then pierces the surface of chamber 11. This establishes a communication between chambers 11 and 17. This allows vapor 13v to leave chamber 11 and enter chamber 17. The vapor which enters chamber 17 is absorbed or adsorbed by desiccant 19. This reduces the vapor pressure in the chamber 17 to below that of chamber 11. This causes an additional transfer of vapor from chamber 11 to chamber 17. The vapor in chamber 11 is then replaced by additional boiling of water in chamber 11. The water present in beverage 13 boils continuously until desiccant 17 is saturated with water vapor, or until the temperature of the beverage drops to the boiling point of its water. When the temperature of the beverage drops it is ready for consumption. The vapor which is sorbed by desiccant 19 heats the desiccant. If desired, the hot desiccant can be used to heat a food or a beverage (not shown). Filter 31 prevents a contamination of the beverage by the desiccant during the piercing of walls 25 and the surface of chamber 11. Water absorber 18 prevents the return to the beverage chamber of any liquids which have accidentally entered the desiccant chamber.

While the present invention has shown a desiccant chamber which is permanently fixed to the water chamber it is understood that the permenant connection between the chambers may be omitted, and that the chambers may be stored apart from each other. The chambers will be brought together only during the activation of the device. The chambers would be temporarilly held together either manually, or through other means, such as a bar and knob arrangement as described above.

Figure 5:
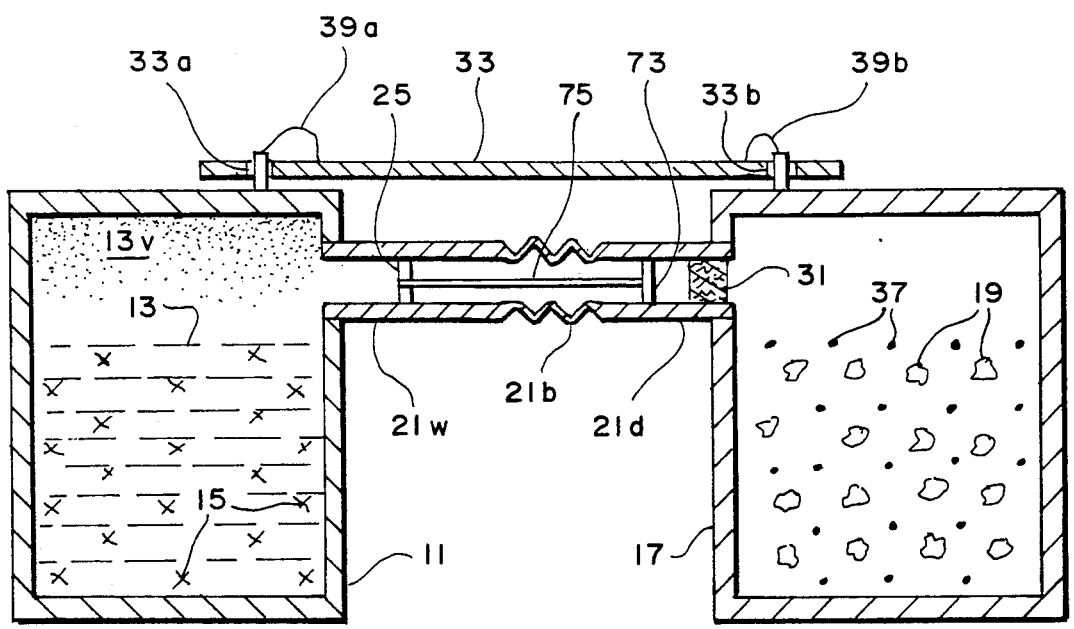
FIG. 5 is a cross-sectional view of an embodiment which uses a pulling action to dislocate the barrier between the chambers.

The embodiment of the invention in FIG. 5 is similar to that of FIG. 4 except that it is adapted to the removal of barrier 25 between the chambers by pulling instead of piercing. Referring to FIG. 5, there is shown a chamber 11. A beverage 13 is present in the chamber. A refrigerant consisting of water 15 is then added into the chamber. The water 15 becomes incorpobated into the natural water of the beverage to form a diluted beverage. The water of the beverage evaporates to form a vapor phase 13v above the liquid level of the beverage-water mixture.

Present beside chamber 11 is another chamber 17. Inside the chamber 17 there is a desiccant 19, such as a non-toxic molecular sieve like Silico Aluminate Zeolite. The desiccant chamber also contains a water absorber 37, such as an SGP absorbent polymer (General Mill Chemicals).

A conduit consisting of a pipe 21 communicates between the top portions of the desiccant chamber 17 and the liquid chamber 11. A middle portion of the walls of pipe 21 is composed of bellows 21-b. The bellows allows a variation in the length of the pipe and in the distance between the chambers. The bellows thus divides pipe 21 into a pipe portion 21-d which is adjacent to desiccant chamber 17, and a pipe portion 21-w which is adjacent to water chamber 11. Present inside pipe portion 21-w is a wall 25. The wall blocks the passage in the pipe so that there is no communication between chambers 11 and 17. The margins of wall 25 are made out soft thin metal that can be easily displaced or torn manually. A rod 73 is present in pipe portion 21-d. The rod is immovably fixed by solder to the inside walls of pipe portion 21-d. Present inside pipe 21 between wall 25 and rod 73 is wire 75. The arrangement is that one end of the wire is soldered to the wall 25 while the other end is soldered to rod 73. The length of wire 75 is equal to the distance between rod 73 and wall 25 when bellows 21-b is in its folded position. When bellows 21-b is is extended the wire pulls and displaces wall 25.

Present inside pipe 21 is a filter 31. The filter is designed to block the transfer of desiccant from the desiccant chamber to the beverage chamber, but to allow a free movement of vapor between the chambers. The filter is glued to the inside walls of the pipe to prevent the filter from falling out of the pipe.

Present on top of the water chamber 11 and the desiccant chamber 17 is bar 33. The bar serves to keep the chambers at a fixed distance from each other, and to prevent an accidental piercing of surfaces 25 and 22 during transportation and storage of the device. The length of bar 33 is such that it keeps the chambers at a distance which keeps bellows 21-b in a folded position. The bar 33 contains a hole 33-a in one end and a hole 33-b on its other end. Present on top of the water chamber 11 is knob 35a. Present on top of the desiccant chamber 17 is knob 35b. Extending from each knob respectively is a metal strip 39-a and 39-b. The arrangement is that the strips are made from a material that is pliable enough to be bent by hand. The location of the holes 33-a and 33-b in relationship to the strips and knobs is such that the holes fit over the strips and the knobs to enclose the knobs. When strips 39-a and 39-b are in a vertical position bar 33 can be easily slipped in and out of the knobs. When the strips are bent to a horizontal or oblique position they prevent the bar from slipping out of the knobs.

The operation of the device is as follows. When a cooling action is not desired, bar 33 rests in knobs 35-a and 35-b and keeps chambers 11 and 17 at a predetermined distance from each other. Bellows 21-b is in its folded position. Strips 39-a and 39-b are in an oblique or horizontal position to prevent bar 33 from slipping from the knobs. Wall 25 prevents a communication between chambers 11 and 17. The vacuum in chamber 11 causes the beverage-water mixture to boil until the vapor pressure in chamber 11 becomes equal to the vapor pressure of the boiling water. This stops the additional boiling of the water, and the device can be stored indefinitely at ambient temperatures without losing its cooling and heating potentials.

When a temperature change is desired strips 39-a and 39-b are put in a vertical position and bar 33 is removed from knobs 35-a and 35-b. Chambers 11 and 17 are then pulled away from each other. This causes the position of bellows 31-b to change from a folded to an extended position. When the bellow moves to an extended position the distance between rod 75 and wall 25 is increased. This causes wire 73 to pull and displace wall 25. This opens the passage of pipe 21 and establishes a communication between chambers 11 and 17. This allows vapor 13-v to leave chamber 11 and enter chamber 17. The vapor which enters chamber 17 is absorbed or adsorbed by desiccant 19. This reduces the vapor pressure in the chamber 17 to below that of chamber 11. This causes an additional transfer of vapor from chamber 11 to chamber 17. The vapor in chamber 11 is then replaced by additional boiling of water in chamber 11. The water present in beverage 13 boils continuously until desiccant 17 is saturated with water vapor, or until the temperature of the beverage drops to the boiling point of its water. When the temperature of the beverage drops it is ready for consumption. The vapor which is sorbed by desiccant 19 heats the desiccant. If desired, the hot desiccant can be used to heat a food or a beverage (not shown). Filter 31 prevents a contamination of the beverage by the desiccant during the piercing of walls 25 and the surface of chamber 11. Water absorber 18 prevents the return to the beverage chamber of any liquids which have accidentally entered the desiccant chamber.

Figure 6:
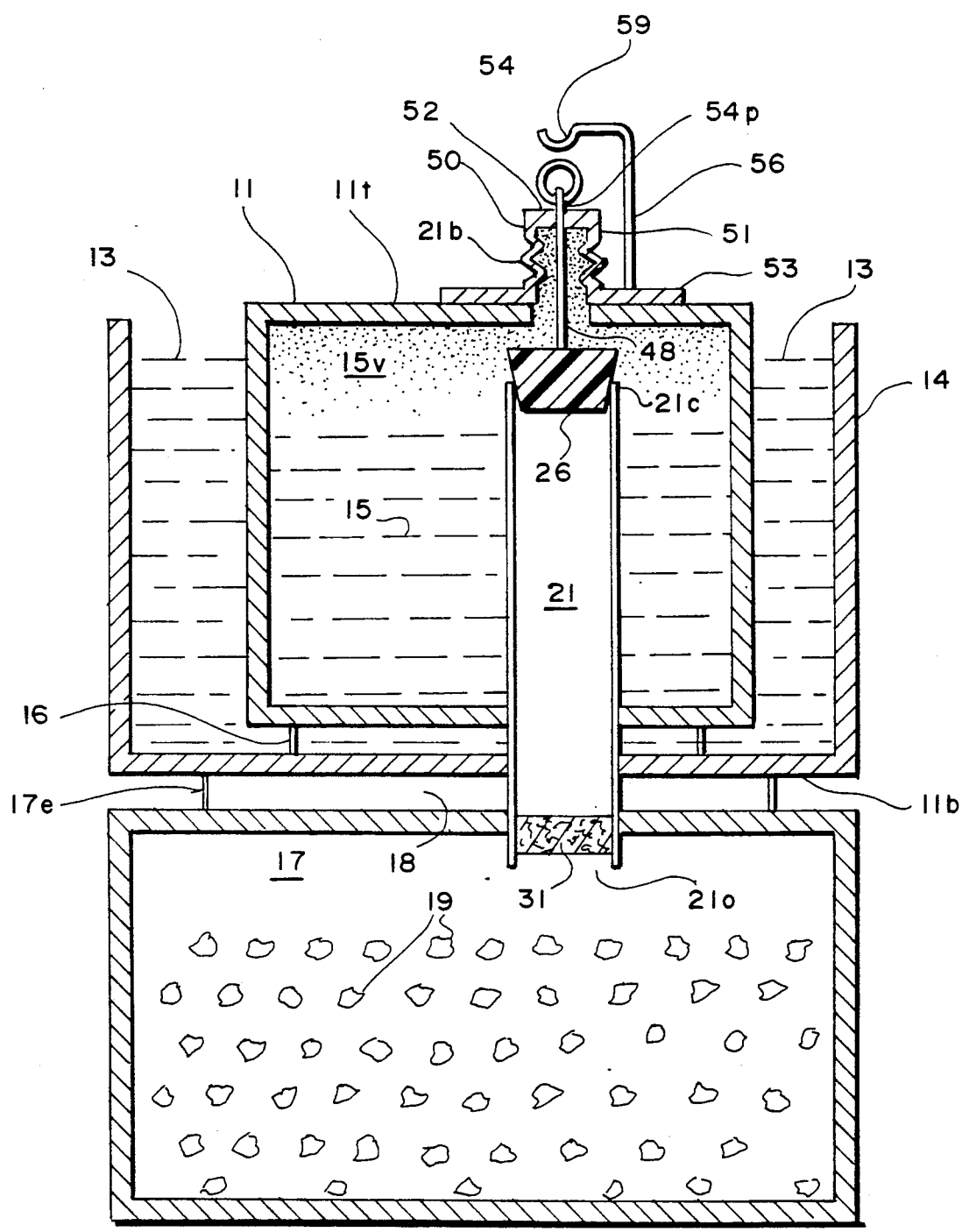
FIG. 6 is a cross-sectional view of an embodiment of a reuseable temperature changer.

Referring to FIG. 6, there is shown a chamber 11, with top wall 11-t and bottom wall 11-b. An air vacuum of at least 5 microns is present in the chamber. Water 15 is present in the chamber. The water evaporates to form a vapor phase 13v above the liquid level of the water 13. Chamber 11 is placed in container 14. The container 14 may be open and may consist of any container which holds a food or a beverage such as such as a glass, a pitcher, or a can. Wall extensions 16 from the bottom inside surface of container 14 are attached to the bottom outside surface of chamber 11 and serve to fix the position of chamber 11 in container 14. Present in container 14 is a beverage 13. The arrangement is that chamber 11 is immersed in beverage 16 to absorb heat from the beverage as will be described.

Present below chamber 14 is another chamber 17. A small air space 18 is present between the chambers. The air space serves as an insulating layer between the chambers. Wall extensions 17-e from the top outside surface of chamber 17 are attached to the bottom outside surface of chamber 11 and serve to fix the the relative positions of chamber 11 and chamber 17. Inside the chamber 17 there is a desiccant 19, such as a non-toxic molecular sieve like Silico Aluminate Zeolite.

Present inside chamber 11 is a pipe 21. The arrangement is that pipe 21 is placed vertically in container 11. The pipe 21 contains a top open end 21-c and a bottom open end 21-o. Top end 21-c is placed at close distance to the top surface of container 11. The bottom portion of pipe 21 goes through the bottom walls of containers 11 and 14 and the top wall of container 17. The open end 21-c of pipe 21 thus communicates with the top inside space of container 11, while the open end 21-o of pipe 21 communicates with the top inside space of container 17. Solder is applied to the junctures of the pipe 21 and the container surfaces which have been penetrated by the pipe to fix the pipe in place, and to prevent any leakage from the junctures. Present on top of end 21-c is a rubber stopper 26. The relative dimensions of stopper 26 and opening 21-c are such that the stopper can be placed in and out of opening 21-c. When the stopper is inserted into opening 21-c it blocks the opening and prevents a communication between pipe 21 and the inside of water chamber 11. When the stopper is taken out of opening 21-c a communication is established between conduit 21 and container 11.

Present on top of water chamber 11 is bellows chamber 50. The bellows chamber has side walls 51, top wall 52, and bottom wall 53. The arrangement is that side walls 51 are vertical to the top surface 11-t of container 11, while top and bottom walls 52 and 53 are parallel to surface 11-t. Bottom wall 53 and surface 11-t contain a gap, respectively. The arrangement is that the gaps coincide and are opposite stopper 26 and pipe opening 21-c. Wall 53 is closely applied to the surface 11-t of chamber 11 and pressed to the surface to expel all air bubbles between the walls. Wall 53 is then fixed in its position by soldering the surfaces 53 and 11-t together. A portion of side walls 51 is composed of bellows 21-b. The bellows allows a variation in the length of the side walls and in the distance between top wall 52 of the bellows chamber and the top surface 11-t of chamber 11. Attached to the top inside surface of wall 52 inside bellows chamber 50 is a rod 48. The arrangement is that the top end of the rod is attached to wall 52 while the bottom end of the rod is attached to the top surface of stopper 26. This associates the movement of wall 52 with the movement of stopper 26. The distance between wall 52 and opening 21-c is such that when bellows 21-b is its folded position stopper 26 is positioned in opening 21-c, and blocks a communication between pipe 21 and chamber 11. When the bellows is in its extended position stopper 22 is positioned outside of opening 21-c and allows a communication between pipe 21 and chamber 11.

Attrached to the outside surface of top wall 52 of bellows container 50 is a ring handle 54. The arrangement is that ring 54 is attached to surface 52 by pivot 54-p. The pivot allows ring 54 to turn freely around the pivot. Extending from the outside surface of wall 53 is a vertical rod 56. Extending from the top of rod 56 is hook 59. The arrangement is that hook 59 can form a support for handle ring 54, as will be described.

Present inside pipe 21 is a filter 31. The filter is designed to block the transfer of desiccant from the desiccant chamber to the beverage chamber, but to allow a free movement of vapor between the chambers. The filter is glued to the inside walls of the pipe to prevent the filter from falling out of the pipe.

The operation of the device is as follows. When a cooling action is not desired stopper 26 is present inside opening 21-c and prevents a communication between chambers 11 and 17. The air vacuum in chamber 11 causes a pressure differential between the inside and and the outside of bellows surface 52. The pressure differential helps keeps the bellows in its folded position during storage of the device. The vacuum in chamber 11 causes the beverage-water mixture to boil until the vapor pressure in chamber 11 becomes equal to the vapor pressure of the boiling water. This stops the additional boiling of the water, and the device can be stored indefinitely at ambient temperatures without losing its cooling and heating potentials.

When a temperature change is desired handle 54 is grasped and wall 52 is pulled upward away from surface 11-t. The upward force required must be sufficient to overcome the atmospheric force which presses downward upon surface 52. For example, the atmospheric force pressing upon a surface 52 of a quarter inch square is about 1 pound. A manual upward force which exceeds 1 pound would, therefore, be required to pull wall 52 upward. As wall 52 is pulled upward the position of bellows 21-c is changed from a folded to an extended position, and stopper 26 is pulled away from opening 21-c. The arrangement is that, when ring 54 reaches the level of hook 59, stopper 26 is completely out of opening 21-c. Ring 54 is pulled up to a level which is slightly higher than the top surface of hook 59. Ring 54 is then turned to enclose hook 57. Ring 54 is then allowed to descend to the level of the hook to rest upon the concave surfaces of the hook. This prevents a further descent of ring 54 and keeps stopper 26 out of opening 21-c. This maintains a communication between chamber 11, chamber 17, pipe 21 and bellows chamber 50; and a communication between the vapor phase of chamber 11 and the top portion of chamber 17. This allows vapor 14-v to leave chamber 11 and enter chamber 17. The vapor which enters chamber 17 is absorbed or adsorbed by desiccant 19. This reduces the vapor pressure in the chamber 17 to below that of chamber 11. This causes an additional transfer of vapor from chamber 11 to chamber 17. The vapor in chamber 11 is then replaced by additional boiling of water in chamber 11. The water present in beverage 13 boils continuously until desiccant 19 is saturated with water vapor, or until the temperature of water 15 drops to its low boiling point. When the temperature of water 15 drops it cools chamber 11. The relatively cold surfaces of container 11 then absorb heat from beverage 13. The vapor which is sorbed by desiccant 19 heats the desiccant. If desired, the hot desiccant can be used to heat a food or a beverage (not shown).

The temperature changing capabilities of the system can be renewed by a selective heating of the desiccant chamber. For example, an oven (not shown) capable of selectively heating the desiccant chamber can be required. This could be accomplished by an oven which would receive desiccant chamber from a top opening. The desiccant chamber would rest at a level which would place the the desiccant chamber inside the oven, but would place the water chamber above and outside the oven. During the selective heating of the desiccant stopper 26 is placed in its open position, as described above. The desiccant chamber is then selectively placed in a oven of 350-400 degrees Farenheit for about 2 hours. The desiccant chamber is then removed from the oven, and stopper 26 is returned to close opening 21-c while the desiccant is still hot. The device can then be stored indefinitely at ambient temperatures without losing its temperature changing potential. It can be activated by removing stopper 22 from opening 21-c as described above.

It is understood that the embodiments illustrated in the detailed description are given as preferred examples only, and that a variety of modification are possible without departing from the essence of the invention. This includes the use of consumable refrigerants other than water, such as alcohol. A variety of means, besides pins and wires, may be used to dislocate the barriers between the liquid and the desiccant chambers. Barrier 25 (to block a communication between the liquid and the desiccant chamber) may be placed between conduit 21 and desiccant chamber 17 instead of between conduit 21 and liquid chamber 11, without departing from the essence of the invention, as set forth in the claims.

What is claimed is:

1. A sorption temperature changer consisting of a cooling chamber,
   a liquid in said chamber,
   a partial vacuum in said liquid chamber to lower the boiling point of said liquid,
   a second chamber, a desiccant in said second chamber,
a communication between said liquid and said desiccant chambers,
means to open and close said communication between the chambers,
a moveable surface portion,
said moveable surface portion adapted to constitute an integral part of said surface to assure a long term leak proof air vacuum in said temperature changer,
and means to associate the movements of said moveable surface portion with said means of opening and closing said communication between the chambers.

2. The invention as described in claim 1 wherein said moveable surface portion consist of a pliable surface material.

3. The invention as described in claim 1 wherein said moveable surface portion consist of flexible material.

4. The invention as described in claim 1 wherein said moveable surface portion consist of a bellows.

5. The invention as described in claim 1 wherein said liquid is water.

6. The invention as describe in claim 1 and including means to immobilize said moving surface portion to prevent an accidental activation of said temperature changer.

7. A reuseable sorption temperature changer consisting of a chamber,
a liquid in said chamber,
a partial vacuum in said liquid chamber to lower the boiling point of said liquid,
a second chamber,
a desiccant in said second chamber,
a conduit between said liquid and said desiccant chambers,
a moveable surface portion,
a stopper associated with said conduit to open and close said conduit,
said stopper adapted to move with said moveable surface to close and open said conduit between the chambers.

8. The invention as described in claim 7 and including means to heat said desiccant chamber to regenerate the desiccant in the chamber.

9. A valveless sorption temperature changer container consisting of a chamber,
a liquid in said chamber,
a partial vacuum in said liquid chamber to lower the boiling point of said liquid,
a second chamber,
a desiccant in said second chamber,
a conduit between said liquid and said desiccant chambers,
a barrier in said conduit to prevent a communication between said liquid and said desiccant chambers during storage of the temperature changer,
a third chamber,
a moveable surface portion in said third chamber,
means to open said barrier to establish a communication between said liquid and said desiccant chambers during the activation of the temperature changer,
said communication adapted to be air vacuum proof,
said means adapted to be responsive to the movements of said moveable surface portion of said third chamber.

10. A sorption temperature changer consisting of a cooling chamber,
a liquid in said chamber,
a partial vacuum in said liquid chamber to lower the boiling point of said liquid,
a second chamber,
a desiccant in said second chamber,
a conduit adapted to form a communication between said liquid and said desiccant chambers during the activation of the temperature changer,
a barrier is said conduit to prevent a communication between said chambers during the storage of the temperature changer,
means to open said barrier,
a moveable surface portion,
said moveable surface adapted to control the movements of said means of opening said barrier.

11. The invention as described in claim 10 wherein said means of opening said barrier consist of pulling means to displace said barrier.

12. The invention as described in claim 11 wherein said barrier is a wall with weak margins.

13. The invention as described in claim 10 wherein said means of opening said barrier consist of a pin means to puncture said barrier.

14. A sorption temperature changer consisting of a cooling chamber,
a liquid in said chamber,
a partial vacuum in said liquid chamber to lower the boiling point of said liquid,
a second chamber,
a desiccant in said second chamber,
a conduit communicating through one end with one of said chambers during storage of the temperature changer,
a wall closing the other end of said conduit,
means to provide a close contact of said wall with a surface portion of the chamber not communicating with said conduit,
said contact adapted to be vacuum proof,
and means to open said wall and said surface portion to establish a communication between said liquid and said desiccant chambers during the activation of said temperature changer.

15. The invention as described in claim 14 and wherein said chambers are adapted to be stored seperately during storage of the temperature changer.

* * * * *